United States Patent
Okamura (10) Patent No.: US 9,891,512 B2
(45) Date of Patent: Feb. 13, 2018

(54) IMAGE PROJECTION APPARATUS AND STORAGE MEDIUM STORING LIGHT SOURCE POWER CONTROL PROGRAM

(71) Applicant: CANON KABUSHIKI KAISHA, Tokyo (JP)

(72) Inventor: Takahiro Okamura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 14/798,594

(22) Filed: Jul. 14, 2015

(65) Prior Publication Data

US 2016/0018724 A1    Jan. 21, 2016

(30) Foreign Application Priority Data

Jul. 17, 2014 (JP) ................. 2014-146872

(51) Int. Cl.
*G03B 21/14* (2006.01)
*G03B 21/20* (2006.01)

(52) U.S. Cl.
CPC ....... *G03B 21/2053* (2013.01); *G03B 21/145* (2013.01); *G03B 21/2013* (2013.01)

(58) Field of Classification Search
CPC .............. G03B 21/2053; G03B 21/145; G03B 21/2013; G03B 21/20; G03B 21/14
USPC .................................... 353/94, 85
See application file for complete search history.

(56) References Cited

U.S. PATENT DOCUMENTS

| | | | | |
|---|---|---|---|---|
| 6,183,093 B1* | 2/2001 | Sawai | ............. | H04N 9/315 348/E9.027 |
| 6,666,896 B1* | 12/2003 | Peng | ............. | H04N 5/74 348/744 |
| 8,022,348 B2 | 9/2011 | Namba et al. | | |
| 2017/0019649 A1* | 1/2017 | Fukuyama | ............. | G03B 21/145 |

FOREIGN PATENT DOCUMENTS

JP   2000338601 A   12/2000
JP   2010032944 A   2/2010

* cited by examiner

*Primary Examiner* — Steven H Whitesell Gordon
*Assistant Examiner* — Jerry Brooks
(74) *Attorney, Agent, or Firm* — Rossi, Kimms & McDowell LLP (57) ABSTRACT

The image projection apparatus combining lights from first and second light sources to project an image. First and second usable times of a first light source in the apparatus installed respectively in first and second installation positions have a relation that, when the power for the first light source is fixed, the second usable time is shorter than the first usable time. The second usable time shorter than a third usable time of the second light source in the second installation position. The power controller sets, in the second installation position, the power for the first light source to be lower than the power for first light source in the first installation position and set the power for the second light source to be equal to or higher than the power for the second light source in the first installation position.

8 Claims, 7 Drawing Sheets

|  | LIGHT SOURCE 101a | LIGHT SOURCE 101b |
|---|---|---|
| FLAT INSTALLATION | C | C |
| UPRIGHT INSTALLATION | B | C or A |
| UPWARD INSTALLATION | C or A | B |
| CEILING MOUNTING | B | C |

POWER SUPPLIED TO LIGHT SOURCES
A > C > B

IMAGE PROJECTION APPARATUS AND STORAGE MEDIUM STORING LIGHT SOURCE POWER CONTROL PROGRAM

BACKGROUND OF THE INVENTION

Field of the Invention

The present invention relates to an image projection apparatus, such as a liquid crystal projector, which uses multiple light sources.

Description of the Related Art

The above image projection apparatus is capable of projecting a large and bright image by combining lights from multiple light sources to produce a high intensity light and by image-modulating the high intensity light with a light modulation element such as a liquid crystal panel or a digital micromirror device (DMD). In such an image projection apparatus, in particular in one using multiple light sources such as discharge lamps that require cooling, all of the light sources should be sufficiently cooled. The reason for this is that an insufficiency in the cooling of the light sources increases a rate of speed at which a brightness (light-emission amount) of each light source decreases, which significantly shortens a lifetime of each light source.

As a method of extending a lifetime of a light source included in an image projection apparatus, Japanese Patent Laid-Open No. 2000-338601 discloses a method of providing multiple light sources to the image projection apparatus and switching, at every start-up of the apparatus, one light source to be lit.

On the other hand, an excessive cooling of the discharge lamp makes a state of enveloped substances such as gas and metal fume fever included in the lamp unstable, which makes it impossible to achieve a stable light emission. For this reason, temperature control of the discharge lamp is important. Japanese Patent Laid-Open No. 2010-032944 discloses a method of controlling, in an image projection apparatus provided with multiple light sources, number of rotations of a cooling fan depending on lighting states of the light sources.

Furthermore, a change of an installation position (e.g., flat installation or upright installation on an installation surface, or ceiling mounting) of the image projection apparatus results in a variation in a temperature distribution around and in the light source. For this reason, it is necessary to perform the cooling and the temperature control of the multiple light sources depending on the installation position of the image projection apparatus. However, Japanese Patent Laid-Open Nos. 2000-338601 and 2010-032944 disclose nothing about the cooling and temperature control of the light sources depending on the installation position of the image projection apparatus. This means that the lifetime of any of the multiple light sources may be significantly shortened depending on the installation position of the image projection apparatus.

SUMMARY OF THE INVENTION

The present invention provides an image projection apparatus capable of preventing a lifetime of any of multiple light sources from being significantly shortened due to an installation position of the apparatus.

The present invention provides as an aspect thereof an image projection apparatus configured to combine lights from multiple light sources including a first light source and a second light source to project an image. The image projection apparatus includes a power source configured to supply powers to the multiple light sources, and a power controller configured to control each of the powers to be supplied from the power source to the multiple light sources. A first usable time as a usable time of the first light source in the image projection apparatus installed in a first installation position and a second usable time as a usable time of the first light source in the image projection apparatus installed in a second installation position have a relation that, under a condition that the power to be supplied to the first light source is fixed, the second usable time is shorter than the first usable time. The second usable time of the first light source and a third usable time as a usable time of the second light source in the image projection apparatus installed in the second installation position have a relation that the second usable time is shorter than the third usable time. The power controller is configured to, in the second installation position, set the power to be supplied to the first light source to be lower than that to be supplied to the first light source in the first installation position and set the power to be supplied to the second light source to be equal to or higher than that to be supplied to the second light source in the first installation position.

The present invention provides as another aspect thereof a non-transitory computer-readable storage medium storing a light source power control program to operate a computer of an image projection apparatus configured to combine lights from multiple light sources including a first light source and a second light source and configured to supply powers from a power source to the multiple light sources. A first usable time as a usable time of the first light source in the image projection apparatus installed in a first installation position and a second usable time as a usable time of the first light source in the image projection apparatus installed in a second installation position have a relation that, under a condition that the power to be supplied to the first light source is fixed, the second usable time is shorter than the first usable time. The second usable time of the first light source and a third usable time as a usable time of the second light source in the image projection apparatus installed in the second installation position have a relation that the second usable time is shorter than the third usable time. The program causes the computer of the apparatus in the second installation position to set the power to be supplied to the first light source to be lower than that to be supplied to the first light source in the first installation position, and set the power to be supplied to the second light source to be equal to or higher than that to be supplied to the second light source in the first installation position.

Further features of the present invention will become apparent from the following description of exemplary embodiments with reference to the attached drawings.

DESCRIPTION OF THE EMBODIMENTS

Exemplary embodiments of the present invention will be described below with reference to the attached drawings.

Embodiment 1

Figure 1:
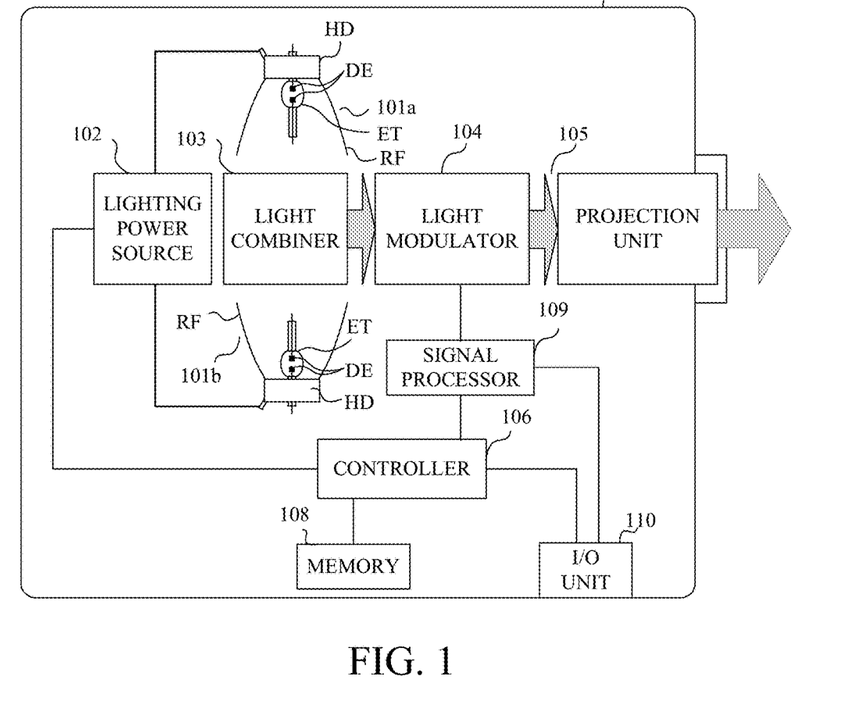
FIG. 1 is a block diagram illustrating a configuration of a projector that is Embodiment 1 of the present invention.

FIG. 1 illustrates a configuration of a projector 1 as an image projection apparatus that is a first embodiment (Embodiment 1) of the present invention.

The projector 1 includes a light source 101a and a light source 101b as multiple light sources. The light sources 101a and 101b are each a discharge lamps such as a super-high pressure mercury lamp. However, light sources other than the discharge lamps may alternatively be used.

The light sources 101a and 101b are lit in response to power supply from a lighting power source 102. The power supply from the lighting power source 102 to each of the light sources 101a and 101b is controlled by a power controller (hereinafter simply referred to as "a controller") 106. The controller 106 supplies, through the lighting power source 102, to each light source a power required for insulation breakdown to start lighting of the light source and controls therethrough the power supplied to adjust a light-emission amount of each light source while keeping the light source electrically discharging after the insulation breakdown. The lighting power source 102 may be constituted by a power intake portion (for example, a receptacle) that takes in power supplied from a power supply source to the projector.

Lights respectively emitted from the light sources 101a and 101b are combined by a light combiner 103. The light combiner 103 is constituted by an optical element such as a mirror, a prism or a lens. The lights combined by the light combiner 103 (combined light) enter a light modulator 104.

The light modulator 104 modulates (image-modulates) the entering light in response to a drive signal input from a signal processor 109. The light modulator 104 includes a color separation optical system that separates the combined light (white light) from the light combiner 103 into three color lights, namely, a red (R) light, a green (G) light and a blue (B) light. The light modulator 104 further includes liquid crystal panels as three light modulation elements that respectively image-modulate the three color lights and a color combination optical system that combines the three modulated color lights. As the light modulation element, a digital micromirror device (DMD) may alternatively be used. In this case, the R, G and B lights sequentially extracted from the white light from the light combiner 103 sequentially enter the single DMD to be image-modulated thereby. The light modulator 104 also includes a drive circuit that drives the light modulation elements (i.e., the liquid crystal panels or the DMD) in response to the drive signal from the signal processor 109.

The light image-modulated by the light modulator 104, that is, a projection image is projected onto a projection surface (not illustrated) such as a screen through a projection unit 105 constituted by an optical system including a lens or a mirror. The projection unit 105 may be integrally fixed to the projector 1 or may be interchangeably mounted to the projector 1.

The signal processor 109 receives an image signal input from outside of the projector 1 through an I/O unit 110 via a cable or by wireless communication. Thereafter, the signal processor 109 performs, on the image signal, a decoding process, various image processes such as keystone correction and scaling, and a superimposition process that superimposes an on-screen-display (OSD) image on the image signal. Finally, the signal processor 109 produces the drive signal corresponding to the image signal subjected to the above-described processes and outputs the drive signal to the light modulator 104.

The controller 106 is constituted by a microcomputer and controls each constituent element in the projector 1 according to a control program as a computer program. The controller 106 sets the powers to be supplied to the respective light sources 101a and 101b for the lighting power source 102, thereby controlling the light-emission amount of each of the light sources 101a and 101b. In addition, the controller 106 performs an image process setting for the signal processor 109 and selects, from various image signals input from the I/O unit 110, one image signal to be used to produce the drive signal input to the light modulator 104. Moreover, the controller 106 acquires information on an installation position (flat installation, upright installation or upward installation which are installation positions on an installation surface, or a ceiling mounting) of the projector 1. This information on the installation position is input by a user's operation of a position setting switch provided on the projector 1 or on a remote controller, or by a user's selection on a menu as the OSD image. Alternatively, the projector 1 may be provided with an installation position detector that automatically detects the installation position of the projector 1 to acquire the information on the installation position of the projector 1 as output of the installation position detector. The switch, the remote controller and the installation position detector correspond to an installation position acquirer.

The I/O unit 110 receives the various image signals (VGA, HDMI®, DVI and other signals) from the outside of the projector 1 and sends the received image signal to the signal processor 109. The I/O unit 101 transmits control signals (RS232C, IR remote controller, Ethernet® and other signals) between the outside of the projector 1 and the controller 106.

A memory 108 is connected to the controller 106 and stores setting parameters to be used by the signal processor 109 and power setting data corresponding to each installation position of the projector 1 for setting the powers to be supplied to the light sources 101a and 101b.

In general, a usable time of a light source, namely, a lifetime thereof is defined as a period of time in which a brightness (light-emission amount) of the light source decreases from its initial value (100%) to a predetermined value (e.g., 50%) lower than the initial value.

Figure 2:
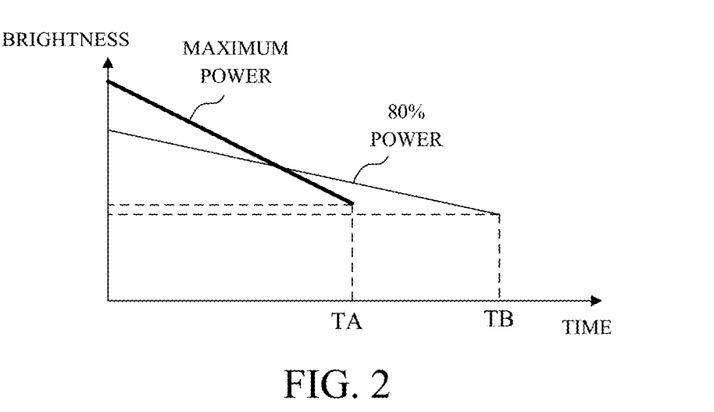
FIG. 2 is a graph illustrating a relation between brightnesses and lifetimes of light sources depending on powers to be supplied to the light sources in Embodiment 1.

FIG. 2 illustrates a variation with time of the brightness of the discharge lamp. A horizontal axis indicates time, and a vertical axis the brightness. A bold line indicates the variation with time of the brightness corresponding to when the power to be supplied to the discharge lamp is set to be high (for example, to a maximum power acceptable as an input power), and a thin line indicates the variation with time of the brightness corresponding to when the power to be supplied to the discharge lamp is set to be low (for example, to 80% of the maximum power). When the power supplied to the discharge lamp is high, the initial value of the brightness of the discharge lamp is higher (that is, brighter) than that corresponding to when the power is low; however, a rate of speed at which the brightness of the discharge lamp decreases is higher than that corresponding to when the power is low, and the brightness therefore decreases to 50% of the initial value in a time TA. On the other hand, when the power supplied to the discharge lamp is low, the initial value of the brightness of the discharge lamp is lower (that is, darker) than that corresponding to when the power is high; however, the rate of speed at which the brightness decreases is lower than that corresponding to when the power is high, and the brightness therefore decreases to 50% of the initial value in a time TB longer than the time TA, that is, at a timing later than that of the time TB. As described above, the discharge lamp has a lifetime characteristic that the lifetime becomes longer as the power decreases under same conditions except for the powers supplied thereto.

The lifetime characteristic of the discharge lamp varies depending also on its orientation (light-emitting direction) and its cooling state. As illustrated in FIG. 1, each discharge lamp (that is, each of the light sources 101a and 101b) is constituted by an emission tube ET inside which a gas and a metal fume fever are included and to which paired discharge electrodes DE are provided and a holder HD that holds one end side portion of the emission tube ET in its longitudinal direction (that is, a direction in which the paired discharge electrodes DE are arranged). The discharge lamp further includes a reflector RF fixed to the HD and having a light-exiting aperture on another end side in the longitudinal direction of the emission tube ET.

The orientation of the discharge lamp is defined as follows. An orientation in which the longitudinal direction of the emission tube ET corresponds to an upward and downward direction and in which the light-exiting aperture of the reflector RF faces downward (that is, the light-emitting direction of the discharge lamp is downward) is defined as "a downward orientation". An orientation in which the longitudinal direction of the emission tube ET corresponds to the upward and downward direction and in which the light-exiting aperture of the reflector RF faces upward is defined as "an upward orientation". An orientation in which the longitudinal direction of the emission tube ET corresponds to a horizontal direction is defined as "a horizontal orientation". For instance, when the discharge lamp is designed to have a longest lifetime (a first usable time) in the horizontal orientation, use of the discharge lamp in the upward and downward orientations under a condition that an identical power (a fixed power) is supplied thereto shortens the lifetime thereof (to a second usable time). Furthermore, use of the discharge lamp in the downward orientation shortens the lifetime (to the second usable time) thereof more than that (a third usable time) when the discharge lamp is used in the upward orientation. The orientation of the discharge lamp depends on the installation position of the projector 1.

On the other hand, the cooling state of the discharge lamp varies depending on a location and a direction of an air intake/exhaust opening formed in the projector 1, a structure of an air flow path inside the projector 1 and other factors. Thus, the cooling state of the discharge lamp is affected by the installation position of the projector 1.

As just described, the lifetime characteristic of the discharge lamp varies depending on the power to be supplied to the discharge lamp and the installation position of the projector 1. For this reason, this embodiment sets a combination of the powers to be supplied to the respective light sources for each installation position of the projector 1 so as to extend, as long as possible, a totaling lifetime, or combined lifetime (a combined usable time) that is a lifetime of the two light sources 101a and 101b as a whole and so as to increase, as much as possible, the light-emission amounts of the light sources 101a and 101b.

Figure 3:
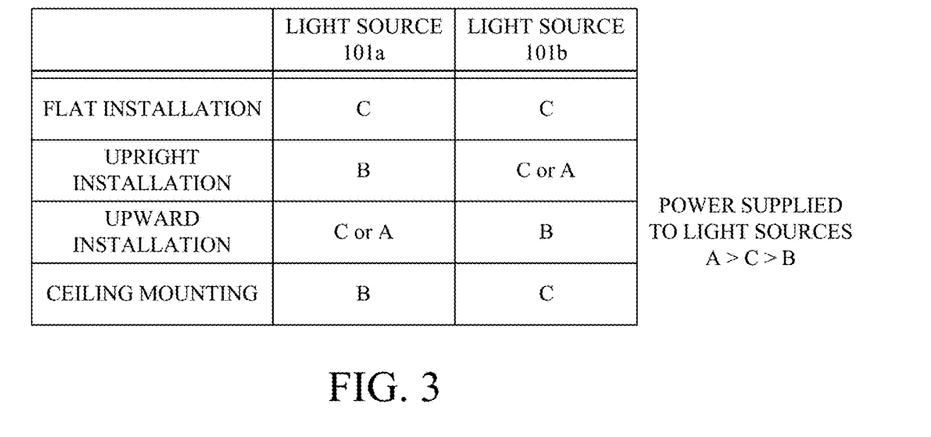
FIG. 3 illustrates table data of the powers to be supplied to the light sources for each installation position in Embodiment 1.

FIG. 3 illustrates an example of the power setting data indicating combinations of set values of the powers to be supplied to the light sources 101a and 101b for the above installation positions of the projector 1. In the drawing, A represents a high power (for example, the above-described maximum power), B a low power lower than the high power (for example, 80% of the maximum power), and C a middle power corresponding to a set value between A and B (for example, 90% of the maximum power). The maximum powers and the powers A to C to be supplied to the light sources 101a and 101b are not necessarily required to be mutually identical and may be mutually different.

FIG. 3 illustrates, as example installation positions of the projector 1, the flat installation, the upright installation, the upward installation and the ceiling mounting. In the flat installation as a first installation position, a top plate and a bottom surface of the projector 1 are parallel to the installation surface or have an inclination angle smaller than 45° with respect to the installation surface. In this flat installation, the light sources 101a and 101b are both in the horizontal orientation, and the set values of the powers to be supplied to the light sources 101a and 101b are both C.

In the upright installation in which the projection image is projected forward, the top plate and the bottom surface of the projector 1 are vertical to the installation surface, side surfaces of the projector 1 are parallel to the installation surface or have an inclination angle smaller than 45° with respect to the installation surface. In this upright installation, the light source 101a is in the downward orientation; the light source 101a corresponds to a first light source. On the other hand, the light source 101b is in the upward orientation; the light source 101b corresponds to a second light source. In this case, the upright installation corresponds to a second installation position with respect to the flat installation corresponds to the first installation position. In the upright installation, the set values of the powers to be supplied to the light sources 101a and 101b are B and C, or B and A. That is, in the upright installation, the power to be supplied to the light source 101a is set to be lower than the power C to be supplied to the light source 101a in the flat installation, and the power to be supplied to the light source 101b is set to be equal to or higher than the power C to be supplied to the light source 101b in the flat installation. Whether the powers to be supplied to the light sources 101a and 101b are set to "B and C" or "B and A" may be selected by the user. Alternatively, they may be fixed only to "B and C" or "B and A".

In the upward installation in which the projection image is projected upward, the top plate and the bottom surface of the projector 1 have an inclination angle of 45° or more with respect to the installation surface or are vertical to the installation surface. In this upward installation, the light sources 101a and 101b are both in the horizontal orientation. Description will be made of a case where, in the upward installation, the air intake opening for the light source 101b provided on a back surface of the projector 1 is located close to the installation surface and a cooling efficiency for the light source 101b is thereby decreased as compared to that for the light source 101a whose air intake opening is formed in the side surface of the projector 1. In this case, the light source 101b corresponds to the first light source, and the light source 101a corresponds to the second light source. The upward installation corresponds to the second installation position with respect to the flat installation corresponds to the first installation position. In this situation, the set values of the powers to be supplied to the light sources 101a and 101b are "C and B" or "A and B". That is, in the upward installation, the power to be supplied to the light source 101b is set to be lower than the power C to be supplied to the light source 101b in the flat installation, and the power to be supplied to the light source 101a is set to be equal to or higher than the power C to be supplied to the light source 101a in the flat installation. Whether the powers to be supplied to the light sources 101a and 101b are set to "C and B" or "A and B" may be selected by the user. Alternatively, they may be fixed only to "C and B" or "A and B".

In the ceiling mounting, the top plate and the bottom surface of the projector 1 are parallel to a ceiling surface of an installation room or have an inclination angle smaller than 45° with respect to a ceiling surface of the installation room. In this ceiling mounting, the light sources 101a and 101b are both in the horizontal orientation. Description will be made of a case where, in the ceiling mounting, the projector 1 is installed upside down with respect to when being in the flat installation and a cooling air flow in the projector 1 is affected thereby, which decreases the cooling efficiency for the light source 101a as compared to that for the light source 101b. In this case, the light source 101a corresponds to the first light source, and the light source 101b corresponds to the second light source. The ceiling mounting corresponds to the second installation position with respect to the flat installation corresponds to the first installation position. In this situation, the set value of the power to be supplied to the light source 101a is B, and the set value of the power to be supplied to the light source 101a is C. That is, in the ceiling mounting, the power to be supplied to the light source 101a is set to be lower than the power C to be supplied to the light source 101a in the flat installation, and the power to be supplied to the light source 101b is set to equal to the power C to be supplied to the light source 101b in the flat installation.

The set values of the powers to be supplied to the light sources shown in FIG. 3 are merely examples and may be other set values.

The memory 108 stores the above-described power setting data in a form of table data. The controller 106 reads, from the table data, the power setting data corresponding to the acquired installation position information to set the powers to be supplied to the light sources 101a and 101b for the lighting power source 102.

Figure 4:
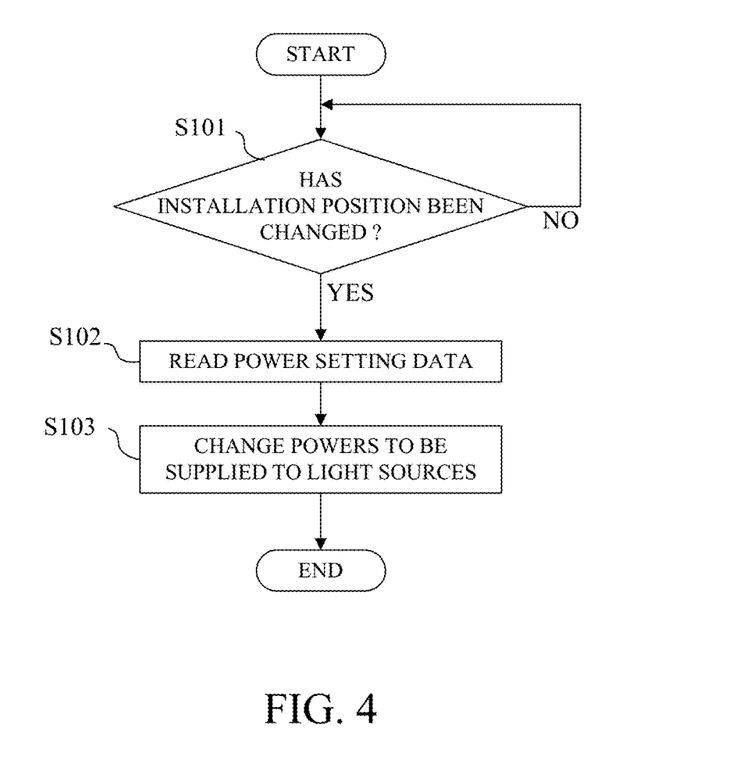
FIG. 4 is a flowchart illustrating power supply control for the light sources in Embodiment 1.

Next, with reference to a flowchart of FIG. 4, description will be made of control of the power supply to the light sources 101a and 101b performed by the controller 106. The controller 106 operates to perform this power supply control according to a light source power control program included in the above-described control program. In this operation, as an initial power to be supplied to each of the light sources 101a and 101b, the power C corresponding to the flat installation shown in FIG. 3 is set.

At step S101, the controller 106 takes in the information on the installation position of the projector 1 acquired from the above-described position setting switch, OSD menu or installation position detector to determine whether or not the installation position has been changed from the flat installation. If determining that the installation position has been changed, the controller 106 proceeds to step S102. If not, the controller 106 repeats this determination.

At step S102, the controller 106 reads, from the table data stored in the memory 108, the power setting data corresponding to the changed installation position (i.e., to the upright installation, the upward installation or the ceiling mounting). For instance, when the changed installation position is the upright installation, the controller 106 reads B and C (or B and A) as the set values of the powers to be supplied to the light sources 101a and 101b.

Then, at step S103, the controller 106 sets, depending on the read power setting data, the powers to be supplied from the lighting power source 102 to the light sources 101a and 101b. This setting allows the powers to be supplied to the light sources 101a and 101b so as to extend the combined lifetime in a current installation position as long as possible and so as to increase, as much as possible, a light amount of the combined light including the lights from the light sources 101a and 101b, that is, an amount of the light to be projected (hereinafter referred to as "a projection light amount") from the projector 1).

Figure 5:
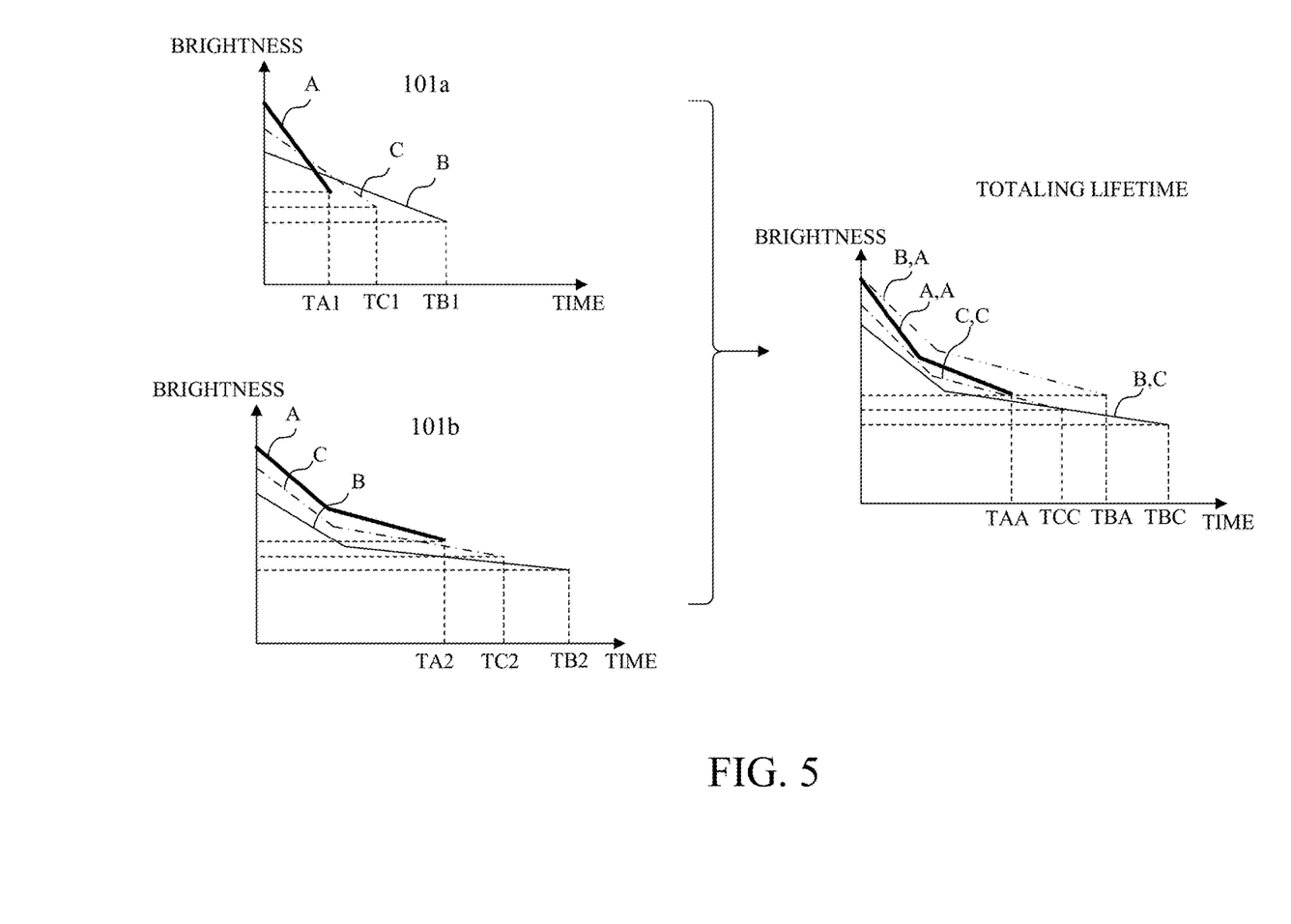
FIG. 5 is a graph illustrating a relation between the brightnesses and the lifetimes of the light sources at an upright installation position depending on the powers to be supplied to the light sources in Embodiment 1.

FIG. 5 illustrates a relation between the powers to be supplied to the light sources 101a and 101b and the lifetimes thereof corresponding to when the projector 1 is installed in the upright installation. As illustrated at an upper left of the drawing, when the power supplied to the light source 101a having the downward orientation in the projector 1 installed in the upright installation is A, C or B (A>C>B), the lifetime of the light source 101a is TA1, TC1 or TB1 (TA1<TC1<TB1), respectively. Similarly, as illustrated at a lower left of the drawing, when the power supplied to the light source 101b having the upward orientation in the projector 1 installed in the upright installation is A, C or B, the lifetime of the light source 101b is TA2, TC2 or TB2 (TA2<TC2<TB2), respectively. However, conditions of TA1<TA2, TC1<TC2 and TB1<TB2 are satisfied.

As illustrated at a right side of the drawing, when the powers supplied to the light sources 101a and 101b are "C and C", "B and C", "B and A" or "A and A", the combined lifetime is TCC, TBC, TBA or TAA (TAA<TCC<TBA<TBC), respectively. In the power supply control in this embodiment, the powers to be supplied to the light sources 101a and 101b are set to "B and C" or "B and A" when the projector 1 is installed in the upright installation. Of multiple combinations of the powers that can be supplied to the light sources 101a and 101b (that is, "C and C", "B and C", "B and A" and "A and A), the combination of B and C is a combination in which the projection light amount is slightly decreased as compared to that in the combination of C and C (specifically, by a projection light amount corresponding to a 10%-reduced power for the light source 101a), but which provides the longest combined lifetime TBC. On the other hand, of the multiple combinations of the powers that can be supplied to the light sources 101a and 101b, the combination of B and A is a combination in which the brightness is equivalent to that in the combination of C and C and which provides the combined lifetime TBA longer than TCC (however, shorter than TBC). Also in the upward installation and the ceiling mounting, as in the relation shown in FIG. 5, the combined lifetime and the projection light amount each corresponding to the combination of the supplied powers to the light sources 101a and 101b are provided.

This embodiment enables appropriately controlling the combination of the powers to be supplied to the light sources 101a and 101b, depending on the installation position of the projector 1. In particular, this embodiment enables setting the power to be supplied to the light source 101a in the upright installation to be lower than the power to be supplied to the light source 101a in the flat installation and setting the power to be supplied to the light source 101b in the upright installation to be equal to or higher than the power to be supplied to the light source 101b in the flat installation. Thus, this embodiment enables, even when the installation position of the projector 1 is the upright installation (or the upward installation or the ceiling mounting), without a significant change in the projection light amount, preventing the lifetime of the light source 101a from becoming shorter as compared to the lifetime corresponding to the flat installation. Accordingly, this embodiment enables extending the combined lifetime of the light sources 101a and 101b.

Embodiment 2

Figure 6:
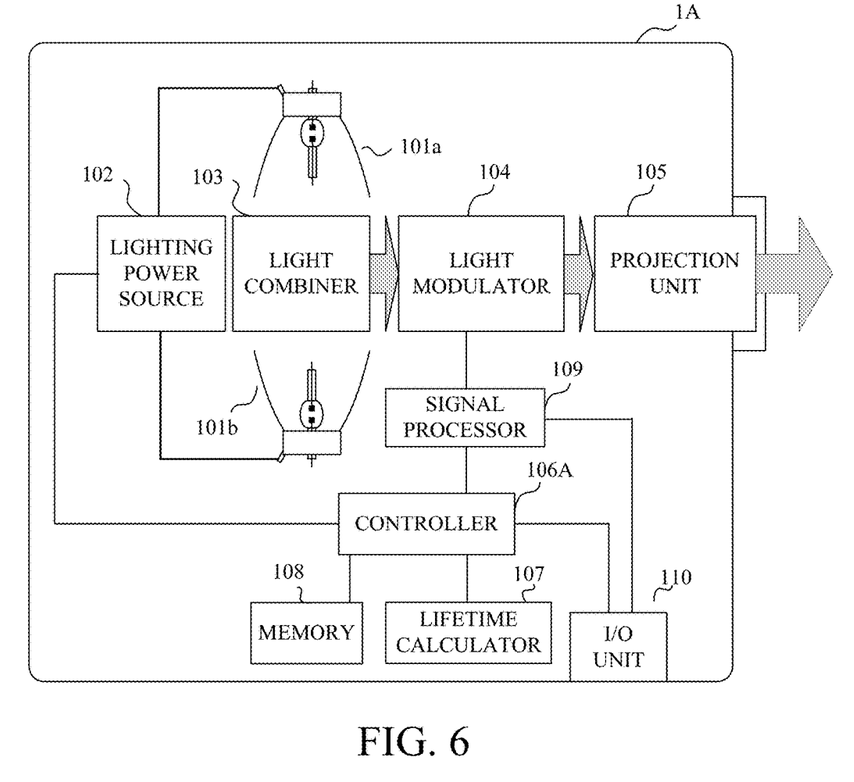
FIG. 6 is a block diagram illustrating a configuration of a projector that is Embodiment 2 of the present invention.

FIG. 6 illustrates a configuration of a projector 1A that is a second embodiment (Embodiment 2) of the present invention. In this embodiment, constituent elements identical to those of the projector 1 of Embodiment 1 (illustrated in FIG. 1) are denoted by the same reference numerals as those in Embodiment 1, and description thereof is omitted. In this embodiment, instead of the configuration in which the controller 106 reads the power setting data from the memory 108 to set the powers to be supplied to the light sources 101a and 101b, a controller 106A sets the powers to be supplied to the light sources 101a and 101b depending on lifetimes thereof calculated by a lifetime calculator 107.

In this embodiment, the memory 108 stores a use history of the projector 1A including its installation position, the powers supplied to the respective light sources 101a and 101b, cumulative lighting times of the respective light sources 101a and 101b and others.

Figure 7:
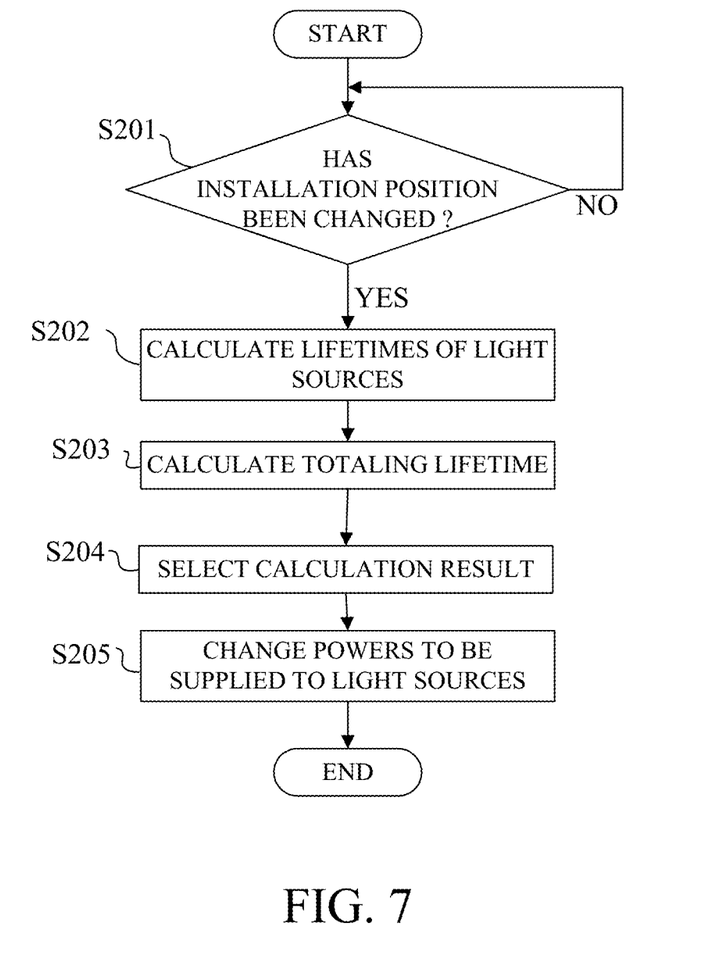
FIG. 7 is a flowchart illustrating power supply control for light sources in Embodiment 2.

Next, with reference to a flowchart of FIG. 7, description will be made of power supply control for the light sources 101a and 101b performed by the controller 106A. The controller 106A operates to perform this power supply control according to a light source power control program that is a computer program. In this operation, as an initial supplied power to each of the light sources 101a and 101b, a power C corresponding to the flat installation described in Embodiment 1 (illustrated in FIG. 3) is set.

At step S201, the controller 106A takes in the information on the installation position of the projector 1A acquired from the position setting switch, the OSD menu or the installation position detector each described in Embodiment 1 to determine whether or not the installation position has been changed from the flat installation. If determining that the installation position has been changed, the controller 106A proceeds to step S202. If not, the controller 1A repeats the determination.

At step S202, the controller 106A causes the lifetime calculator 107 to calculate the lifetimes of the light sources 101a and 101b in the changed installation position (i.e., in the upright installation, the upward installation or the ceiling mounting). The lifetime calculator 107 calculates the lifetimes of the light sources 101a and 101b corresponding to when the powers to be supplied to the light sources 101a and 101b in the changed installation position are A, C or B (A>C>B) described in Embodiment (illustrated in FIG. 3). The lifetime calculator 107 calculates the lifetimes by using lifetime calculation parameters and coefficients prestored for each installation position. The lifetime calculation parameters and coefficients include temperature distributions of and cooling efficiencies for the respective light sources 101a and 101b and the above-described use history of the projector 1A.

Next, at step S203, the controller 106A causes the lifetime calculator 107 to calculate a combined lifetime of the light sources 101a and 101b in the changed installation position in each of multiple combinations of the powers A, C and B that can be supplied to the light sources 101a and 101b. For instance, when the projector 1A is installed in the upright installation, the controller 106A causes the lifetime calculator 107 to calculate combined lifetimes TCC, TBC, TBA and TAA respectively corresponding to the combinations of "C and C", "B and C", "B and A" and "A and A" described in Embodiment 1 (illustrated in FIG. 5).

Next, at step S204, the controller 106A receives, from the lifetime calculator 107, results of the calculation of the combined lifetimes for the multiple combinations of the powers. Then, the controller 106A selects, in response to a selection by a user depending on the calculation results, one of the combinations of the powers to be supplied to the light sources 101a and 101b. Selectable combinations of the powers include one which provides a longest combined lifetime (that is, the combination of B and C) and one which provides an equivalent projection light amount and a longer combined lifetime (that is, the combination of B and A) as compared to those in the combination of C and C.

Subsequently, at step S205, the controller 106A sets the combination of the powers selected at step S204, as the powers to be supplied from the lighting power source 102 to the light sources 101a and 101b. This setting allows the powers to be supplied to the light sources 101a and 101b so as to extend the combined lifetime in a current installation position as long as possible and so as to increase, as much as possible, the light amount of the combined light from the light sources 101a and 101b (that is, the projection light amount from the projector 1A) of the combined light.

As in Embodiment 1, this embodiment enables appropriately controlling the combination of the powers to be supplied to the light sources 101a and 101b, depending on the installation position of the projector 1A. Thus, this embodiment enables, even when the installation position of the projector 1 is the upright installation (or the upward installation or the ceiling mounting), without a significant change in the projection light amount, preventing the lifetime of the light source 101a from becoming shorter as compared to the lifetime corresponding to the flat installation. Accordingly, this embodiment enables extending the combined lifetime of the light sources 101a and 101b.

Embodiment 3

Figure 8:
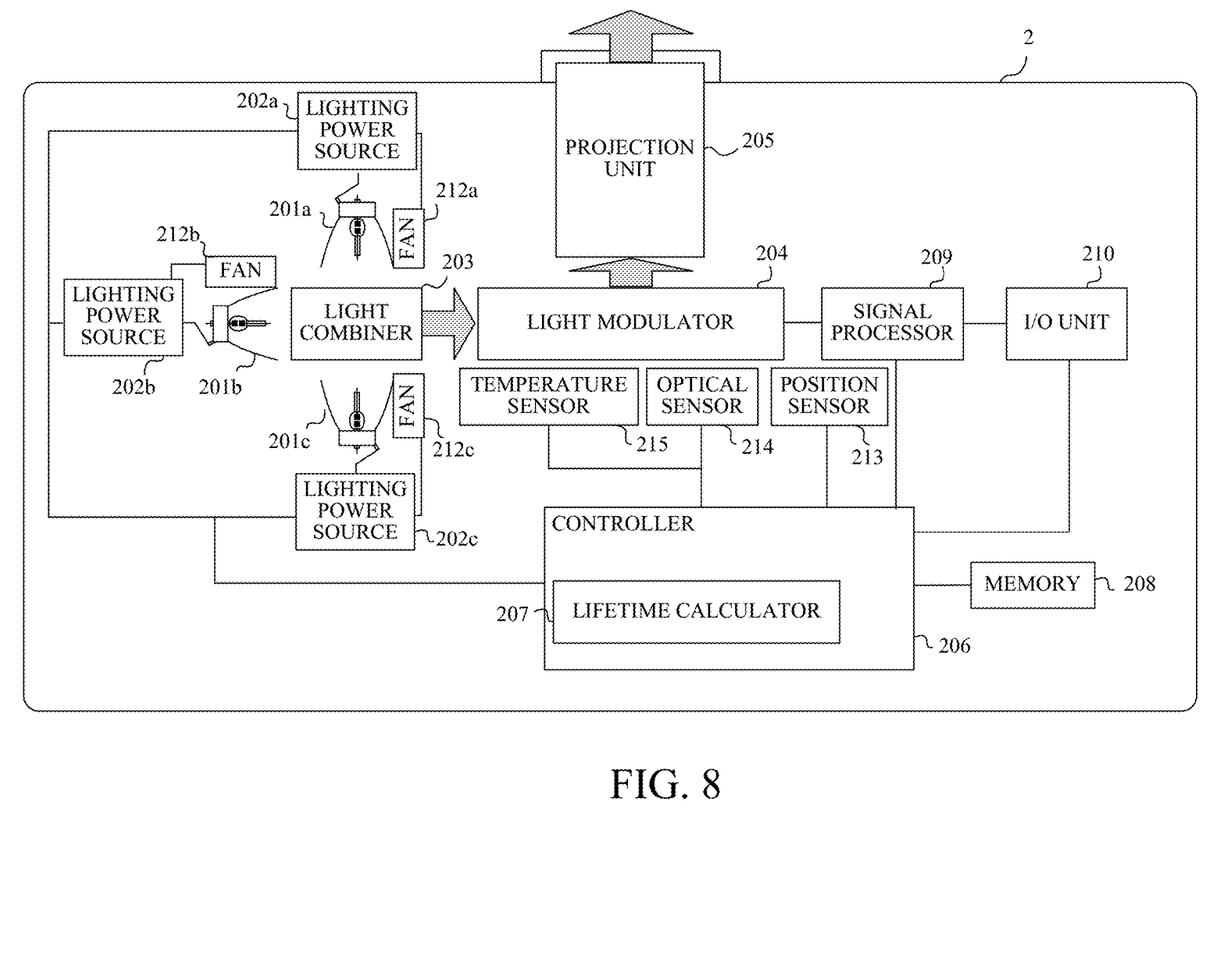
FIG. 8 is a block diagram illustrating a configuration of a projector that is Embodiment 3 of the present invention.

FIG. 8 illustrates a configuration of a projector 2 as a third embodiment (Embodiment 3) of the present invention. In this embodiment, constituent elements identical to those of the projector 1 described in Embodiment 1 (illustrated in FIG. 1) are denoted by the same reference numerals as those in Embodiment 1, and description thereof is omitted.

The projector 2 of this embodiment includes a light source 201a, a light source 201b and a light source 201c as multiple light sources. The light source 201a is lit in response to power supply from a lighting power source 202a, the light source 201b is lit in response to power supply from a lighting power source 202b, and the light source 201c is lit in response to power supply from a lighting power source 202c.

Lights respectively emitted from the light sources 201a, 201b and 201c are combined by a light combiner 203. The light combiner 203 is constituted by an optical element such as a mirror, a prism or a lens. The lights combined by the light combiner 203 (combined lights) enter a light modulator 204.

The light modulator 204 modulates (image-modulates) the entering light in response to a drive signal input from a signal processor 209. The light modulator 204 includes a color separation optical system that separates the combined light (white light) from the light combiner 203 into three color lights, namely, a red (R) light, a green (G) light and a blue (B) light, liquid crystal panels serving as three light modulation elements that respectively image-modulate the three color lights and a color combination optical system that combines the three image-modulated color lights. As the light modulation element, a digital micromirror device (DMD) may alternatively be used. In this case, the R, G and B lights sequentially extracted from the white light from the light combiner 203 sequentially enter the single DMD to be image-modulated thereby. The light modulator 204 also includes a drive circuit that drives the light modulation elements (i.e., the liquid crystal panels or the DMD) in response to the drive signal from the signal processor 209.

The light image-modulated by the light modulator 204 is projected onto a projection surface (not illustrated) such as a screen through a projection unit 205 constituted by an optical system including a lens or a mirror. The projection unit 205 may be integrally fixed to or interchangeably attached to the projector 2.

The projector 2 includes cooling fans 212a, 212b and 212c for respectively cooling (air-cooling) the light sources 201a, 201b and 201c. The cooling fans 212a, 212b and 212c are also driven in response to power supply from the lighting power sources 202a, 202b and 202c.

The controller 206 is constituted by a microcomputer and controls each constituent element in the projector 1 according to a control program as a computer program. The controller 206 sets, for the lighting power sources 202a, 202b and 202c, powers to be supplied to the light sources 201a, 201b and 201c and to the cooling fans 212a, 212b and 212c to control light-emission amounts of the respective light sources 201a, 201b and 201c and number of rotations of the respective cooling fans 212a, 212b and 212c. The projector 2 further includes a position sensor (installation position detector) 213 that detects an installation position of the projector 2, an optical sensor 214 that detects a brightness of the combined light including the lights from the light sources 201a, 201b and 201c, and a temperature sensor 215 that detects a temperature inside the projector 2. Outputs of the sensors 213 to 215 are input to the controller 206. The position sensor 213 is constituted by, for example, an acceleration sensor. The optical sensor 214 is constituted by, for example, a photodiode. Alternatively, the light sensor may be provided to each of the light sources to detect the brightness of the light from each light source. Although only one temperature sensor 215 is illustrated in the drawing, multiple temperature sensors are actually provided so as to be respectively located close to an air intake opening, an air exhaust opening and the light modulation elements, each of which are provided to the projector 2.

A memory 208 stores a use history including its installation position, the powers supplied to the respective light sources 201a, 201b and 201c, cumulative lighting times of the respective light sources 201a, 201b and 201c and others.

The controller 206 includes a lifetime calculator 207 therein. The lifetime calculator 207 calculates lifetimes of the light sources 201a, 201b and 201c corresponding to the installation position (i.e., flat installation, upright installation, upward installation or ceiling mounting) of the projector 2 and a combined lifetime of the light sources 201a, 201b and 201c. In this embodiment, in the upright installation, the light source 201b being in an upward orientation corresponds to a first light source, and the light sources 201a and 201c being in a horizontal orientation each correspond to a second light source. On the other hand, in the upward installation, the light source 201a being in a downward orientation corresponds to the first light source, the light source 201c being in the upward orientation corresponds to the second light source with respect to the light source 201a, and the light source 201b being in the horizontal orientation corresponds to the second light source when the light source 201c is regarded as the first light source. Furthermore, in the ceiling mounting, all of the light sources 201a to 201c are in the horizontal orientation. However, due to the reasons described in Embodiment, for example, the light source 201c corresponds to the first light source, and the light sources 201a and 201b each correspond to the second light source.

Figure 9:
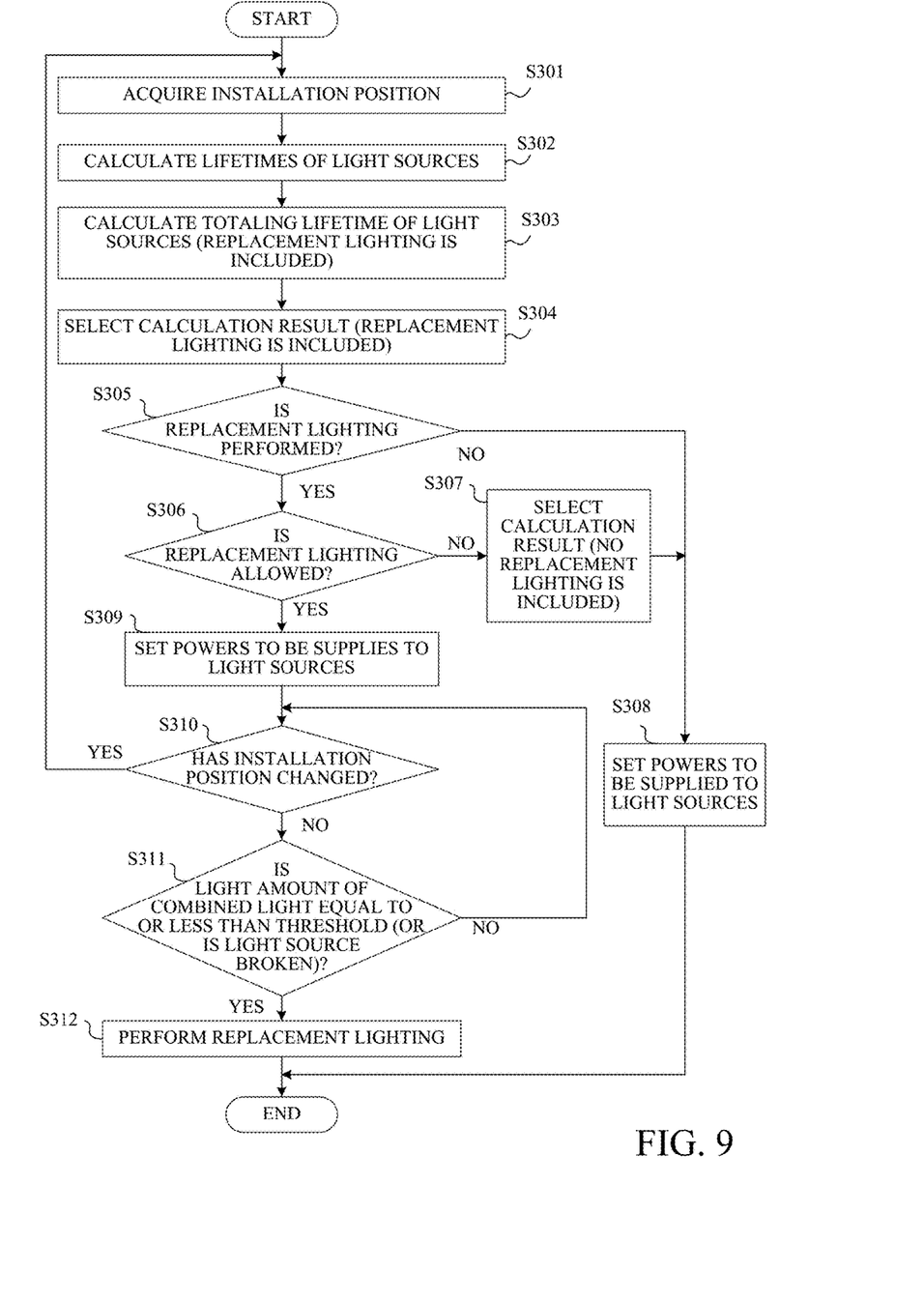
FIG. 9 is a flowchart illustrating power supply control for light sources in Embodiment 3.

Next, with reference to a flowchart of FIG. 9, description will be made of power supply control for the light sources 201a, 201b and 201c performed by the controller 206. The controller 206 operates to perform this power supply control according to a light source power control program.

At step S301, the controller 206 acquires, from the position sensor 213, information on the installation position of the projector 2 (that is, detects the installation position).

Next, at step S302, the controller 206 causes the lifetime calculator 207 to calculate the lifetimes of the light sources 201a to 201c corresponding to the installation position acquired at step S301. The lifetime calculator 207 calculates the lifetimes of the light sources 201a to 201c corresponding to the installation position in a case where the powers to be supplied to the light sources 201a to 201c are respectively A, C and B (A>C>B) as described in Embodiment 1 (illustrated in FIG. 3), by using lifetime calculation parameters and coefficients prestored for each installation position. The lifetime calculation parameters and coefficients include temperature distributions of and cooling efficiencies for the respective light sources 201a to 201c and the use history of the projector 2 stored in the memory 208.

Next, at step S303, the controller 206 causes the lifetime calculator 207 to calculate the combined lifetime of the light sources 201a to 201c corresponding to a current installation position for multiple combinations of the powers A, C and B that can be supplied to the light sources 201a to 201c. When at least one of the light sources 201a to 201c has a lifetime significantly shorter than those of the other light sources, the lifetime calculator 207 additionally calculates a combined lifetime corresponding to when the projector 2 is used with the at least one light source being unlit. In such a case where at least one of the light sources 201a to 201c is initially unlit, the unlighted light source is reserved to be later lit instead of the other light sources (that is, a replacement lighting of the light source is performed) when their light-emission amounts each become equal to or less than a predetermined threshold. This replacement lightning enables extending the combined lifetime of the light sources 201a to 201c as a whole.

Next, at step S304, the controller 206 receives, from the lifetime calculator 207, results of the calculation of the combined lifetimes for the multiple combinations of the powers. Thereafter, the controller 206 selects, in response to a selection by a user depending on the calculation results, one of the combinations of the powers to be supplied to the light sources 201a to 201c.

Selectable combinations of the powers include one which provides a longest combined lifetime and one which provides, though not providing the longest totaling lifetime, a longest time during which a total light amount of the combined light from all of the light sources or provides an average light amount of the combined light is largest. Alternatively, the combination of the powers may be selected on a condition that a light amount of the combined light (that is, a projection light amount) is not lower than a light amount set by the user.

The controller 206 is further capable of calculating (selecting) the combinations of the powers to be supplied to the light sources in the case of performing the replacement lighting of the light source. When the controller 206 selects, at step S305, the combination corresponding to when the replacement lighting of the light source is performed, the controller 206 proceeds to step S306. When the controller 206 selects, at step S305, the combination corresponding to when the replacement lighting of the light source is not performed, the controller 206 proceeds to step S308.

Furthermore, in the calculation of the combination of the powers supplied to the light sources 201a to 201c for the detected installation position, the controller 206 additionally calculates the powers to be supplied to the cooling fans so as to optimize the number of rotations of the respective cooling fans 212a to 212c for the installation position.

At step S306, the controller 206 determines whether or not the replacement lighting of the light source is allowed. Whether or not the replacement lighting is allowed may be preset in response to selection by the user or may be selected by the user at this step. If determining that the replacement lighting of the light source is possible, the controller 206 proceeds to step S309. If determining that the replacement lighting of the light source is not possible, the controller 206 proceeds to step S307.

At step S307, the controller 206 selects a user's specified one of the combinations of the powers to be supplied to the light sources 201a to 201c corresponding to when the replacement lighting is not performed. Then, the controller 206 proceeds to step S308.

At step S308, the controller 206 sets, depending on the combination (corresponding to when the replacement lighting is not performed) selected at step S304 or S307, the powers to be supplied from the lighting power sources 202a to 202c to the light sources 201a to 201c. This setting allows the powers to be supplied to the light sources 201a to 201c in the current installation position so as to extend, as long as possible, the combined lifetime corresponding to when the replacement lighting is not performed and so as to increase, as much as possible, a light amount of the combined light (i.e., the projection light amount from the projector 1) from all of the light sources 201a to 201c. Thereafter, the controller 206 ends this process.

At step S309, the controller 206 sets, depending on the combination (including that corresponding to when the replacement lighting is performed) selected at step S304, the powers to be supplied from the lighting power sources 202a to 202c to the light sources 201a to 201c. This setting allows the powers to be supplied to the light sources 201a to 201c in the current installation position so as to extend, as long as possible, the combined lifetime corresponding to when the replacement lighting is performed and so as to increase, as much as possible, the light amount of the combined light from all of the light sources 201a to 201c (i.e., the projection light amount from the projector 1). Then, the controller 206 proceeds to step S310.

After setting the powers to be supplied to the light sources 201a to 201c, at step S310, the controller 206 monitors whether or not the installation position detected by the position sensor 213 has been changed. If the information on the installation position has been changed, the controller 206 returns to step S301 to set the powers to be supplied to the light sources 201a to 201c for the changed installation position. On the other hand, if the information on the installation position has not been changed, the controller 206 proceeds to step S311 to monitor, by using the light sensor 214, a variation in the light amount of the combined light from the light sources 201a to 201c (or the light-emission amounts of the respective light sources 201a to 201c). If the light amount becomes equal to or less than the predetermined threshold, the controller 206 proceeds to step S312 to turn off the light sources whose lifetime is nearly over and turn on the reserved light source. That is, the controller 206 performs the switch lighting. At this step, the controller 206 notifies the user that the replacement lighting has been performed, by projection of a message, lighting of an informing LED, an electronic mail or the like. Thereafter, the controller 206 ends this process. On the other hand, when the light amount is larger than the predetermined threshold, the controller 206 returns to step S310.

At step S311, the controller 206 may additionally detect whether or not at least one of the lighted light sources is broken. When the at least one of the light sources is broken, the controller 206 makes, at step S312, a notification prompting the user to replace the broken light source.

This embodiment enables appropriately controlling the combination of the powers to be supplied to the light sources 201a to 201c, depending on the installation position of the projector 2. Thus, this embodiment enables extending the combined lifetime of the multiple light sources regardless of the installation position without a significant variation in the projection light amount. Moreover, the configuration in which at least one of the multiple light sources is initially unlit and is lit when the lifetime of at least one of the other light sources is nearly over (that is, in which the replacement lighting is allowed) enables further extending the combined lifetime.

Although this embodiment described the case of detecting the installation position of the projector 2 by using the position sensor 213, the information on the installation position may alternatively be acquired that is estimated from a temperature variation in the projector 2 detected by the temperature sensor 215 or from a variation in the light-emission amount of each light source detected by the light sensor 214.

In addition, the installation position detection, the lifetime calculation and the setting of the powers to be supplied to the light sources may be performed only at a specific timing such as at a time of power-on of the projector or may be repeatedly performed at a predetermined period. Alternatively, the installation position detection, the lifetime calculation and the setting of the powers to be supplied to the light sources may be performed together with an image process at a timing at which the projection image is changed.

Furthermore, the light combiner may be alternatively configured to be interchangeable and may be interchanged at the replacement lighting depending on the light sources to be lit. This configuration allows efficiently combining the lights from the lighted light sources.

As described above, each of the embodiments enables appropriately setting the combination of the powers to be supplied to the first and second light sources depending on the installation position of the image projection apparatus.

Thus, each of the embodiments enables preventing a significant shortening of the usable time (lifetime) of any of the first and second light sources due to the installation position and thereby enables preventing shortening of the lifetime of the whole of the multiple light sources.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-146872, filed on Jul. 17, 2014, which is hereby incorporated by reference herein in its entirety.

What is claimed is:

1. An image projection apparatus configured to combine lights from multiple light sources including a first light source and a second light source to project an image, the image projection apparatus comprising: a power source configured to supply powers to the multiple light sources; and a power controller configured to control each of the powers to be supplied from the power source to the multiple light sources, wherein a first usable time as a usable time of the first light source in the image projection apparatus installed in a first installation position and a second usable time as a usable time of the first light source in the image projection apparatus installed in a second installation position have a relation that, under a condition that the power to be supplied to the first light source is fixed, the second usable time is shorter than the first usable time, and the second usable time of the first light source and a third usable time as a usable time of the second light source in the image projection apparatus installed in the second installation position have a relation that the second usable time is shorter than the third usable time, and wherein the power controller is configured to acquire information indicating whether the image projection apparatus is installed in the first or second installation position and configured to, in the second installation position, (a) set the power to be supplied to the first light source to be lower than that to be supplied to the first light source in the first installation position and (b) set the power to be supplied to the second light source to be equal to or higher than that to be supplied to the second light source in the first installation position such that a usable time of the multiple light sources as a whole in the second installation position in a state where both the first and second light sources are lighted does not become shorter than a usable time of the multiple light sources as a whole in the first installation position in a state where both the first and second light sources are lighted.

2. An image projection apparatus according to claim 1, wherein the first and second light sources are arranged in the image projection apparatus so as to emit the lights toward mutually different directions.

3. An image projection apparatus according to claim 1, wherein:
each of the first and second light sources is a discharge lamp, and
in the second installation position, the first light source emits the light downward in an upward and downward direction.

4. An image projection apparatus according to claim 1, wherein the power controller is configured to set the powers to be supplied to the first and second light sources such that a projection light amount in the first installation position and that in the second installation position are mutually equivalent.

5. An image projection apparatus according to claim 1, wherein the power controller is configured to set a combination of the powers to be supplied to the first and second light sources so as to maximize the usable time of the multiple light sources as a whole in the second installation position.

6. A non-transitory computer-readable storage medium storing a light source power control program to operate a computer of an image projection apparatus configured to combine lights from multiple light sources including a first light source and a second light source and configured to supply powers from a power source to the multiple light sources, a first usable time as a usable time of the first light source in the image projection apparatus installed in a first installation position and a second usable time as a usable time of the first light source in the image projection apparatus installed in a second installation position having a relation that, under a condition that the power to be supplied to the first light source is fixed, the second usable time is shorter than the first usable time, the second usable time of the first light source and a third usable time as a usable time of the second light source in the image projection apparatus installed in the second installation position having a relation that the second usable time is shorter than the third usable time, wherein: the program causes the computer to acquire information indicating whether the image projection apparatus is installed in the first or second installation position, and the program causes the computer in the second installation position to set the power to be supplied to the first light source to be lower than that to be supplied to the first light source in the first installation position and set the power to be supplied to the second light source to be equal to or higher that to be supplied to the second light source in the first installation position such that a usable time of the multiple light sources as a whole in the second installation position in a state where both the first and second light sources are lighted does not become shorter than a usable time of the multiple light sources as a whole in the first installation position in a state where both the first and second light sources are lighted.

7. An image projection apparatus according to claim 1, further comprising an installation position detector configured to detect whether the image projection apparatus is installed in the first or second installation position, wherein the power source is configured to supply powers to the multiple light sources such that at least both the first and second light sources are lighted.

8. An image projection apparatus configured to combine lights from multiple light sources including a first light source and a second light source to project an image, the image projection apparatus comprising: a power source configured to supply powers to the multiple light source; and a power controller configured to control each of the powers to be supplied from the power source to the multiple light sources, wherein the power controller is configured to acquire information indicating whether the image projection apparatus is installed in a flat installation or an upright installation and, in a case where an installation position of the image projection apparatus is the upright installation, (a) set the power to be supplied to the first light source to be lower than that to be supplied to the first light source in a case where the installation position is the flat installation and (b) set the power to be supplied to the second light source to be equal to or higher than that to be supplied to the second light source in a case where the installation position is a flat installation such that a usable time of the multiple light sources as a whole in the upright installation in a state where both the first and second light sources are lighted does not become shorter than a usable time of the multiple light sources as a whole in the flat installation position in a state where both the first and second light sources are lighted.

* * * * *